US008712032B1

(12) United States Patent
Leary, II et al.

(10) Patent No.: US 8,712,032 B1
(45) Date of Patent: Apr. 29, 2014

(54) USING LOCATION BASED SERVICES FOR DETERMINING A CALLING WINDOW

(75) Inventors: Howard S. Leary, II, Ocala, FL (US); Ellwood I. Neuer, III, Newnan, GA (US); Jason P. Ouimette, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/467,101

(22) Filed: May 9, 2012

(51) Int. Cl.
*H04M 3/00* (2006.01)
*H04M 5/00* (2006.01)

(52) U.S. Cl.
USPC ............................................. 379/266.07

(58) Field of Classification Search
USPC ............................ 379/265.01, 265.02, 266.07
See application file for complete search history.

(56) References Cited

U.S. PATENT DOCUMENTS

2002/0168987 A1* 11/2002 Wang et al. ............... 455/456
2007/0172050 A1* 7/2007 Weinstein et al. ....... 379/266.07
2011/0116618 A1* 5/2011 Zyarko et al. ........... 379/266.07
2013/0053027 A1* 2/2013 Lau et al. ................. 455/432.1

OTHER PUBLICATIONS

Maestro 2010.1.1 User Manual, vol. Two, Aug. 3, 2010, 416 pages, Noble Systems Corporation, Atlanta GA 30319.
Maestro 2010.1.1 User Manual, vol. 1, Aug. 17, 2010, 454 pages, Noble Systems Corporation, Atlanta, GA.

* cited by examiner

*Primary Examiner* — Ahmad Matar
*Assistant Examiner* — Nafiz E Hoque

(57) ABSTRACT

Telemarketing calls may originate from a call center based on processing a telephone number record which includes a telephone number. The telephone number record may also include other information pertaining to the telephone number, including whether it is a wireline or wireless number. Further information may indicate whether the solicitation call is being originated on behalf of a wireless carrier serving the wireless subscriber associated with the telephone number. The call center may use location information associated with the wireless number to ascertain a location of the wireless subscriber and to then ascertain a time zone of the wireless subscriber, so as to originate the telemarketing call within the appropriate regulatory calling time window. A dialer may originate calls for an agent using a list of wireline numbers and then using a list of wireless numbers.

17 Claims, 7 Drawing Sheets

| Telephone # | Wireline/ Wireless | Made on Behalf Of Wireless Carrier? | Wireless User Authorization? | Time Zone |
|---|---|---|---|---|
| 404 555 1212 | Wireless | Yes | N.A. | E.S.T. |
| 404 555 1228 | Wired | No | - | E.S.T. |
| 404 556 0020 | Wireless | No | Yes | P.S.T. |
| ... | ... | ... | ... | ... |

FIG. 4

USING LOCATION BASED SERVICES FOR DETERMINING A CALLING WINDOW

BACKGROUND

A call center is typically capable of receiving and/or originating telephone calls involving staff members, also referred to as "telephone service representatives ("TSRs") or "agents." In many instances, the call center is involved in one or more campaigns that originate calls to called parties on behalf of another business. For example, an insurance company may use the call center's services to remind their customers of a policy renewal. Another marketing company may use the call center to conduct a solicitation campaign, etc.

The call center may have agents simultaneously involved in two or more of such campaigns. This can be accomplished by assigning agents to process one of the two types of campaigns, either on a call-by-call basis, or by allocating a subset ("team") of agents to a particular campaign and another team of agents to another campaign. Thus, the equipment originating calls in the call center may originate a call for one campaign followed by the next call for another campaign.

In originating the calls, the call center must comply with various regulatory requirements. Various requirements dictate whether and how calls can be originated to wireless subscribers, when telemarketing calls can originate, and so forth. Compliance with these requirements is important, because violations can subject the call center operator to significant fines. Thus, mechanisms are required to ensure that the call center complies with the appropriate regulations based on the nature of the call originated.

It is with respect to these and other considerations that the disclosure herein is presented.

BRIEF SUMMARY

Technologies are generally presented herein pertaining to processing originating calls, such as telemarketing calls, in a call center using information indicating certain aspects associated with the called number. This information could include whether the called number is a wireless number and/or whether the call is being originated on behalf of a wireless carrier. In one embodiment, information regarding the current location of the called party that is a wireless user may be used to determine a time zone for the called party to determine if the call is within a defined calling window. In another embodiment, the call center may alternate calls for an agent, including e.g., first to a wireline number and then to a wireless number using appropriate dialing procedures for the type of number.

The subject matter disclosed herein may be implemented in various forms, including as, but not limited to, a computer-controlled apparatus, a computer process, a computing system, or as an article of manufacture, such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 4 illustrates a list data file structure indicating telephone number records according to one embodiment disclosed herein.

DETAILED DESCRIPTION

Figure 1:
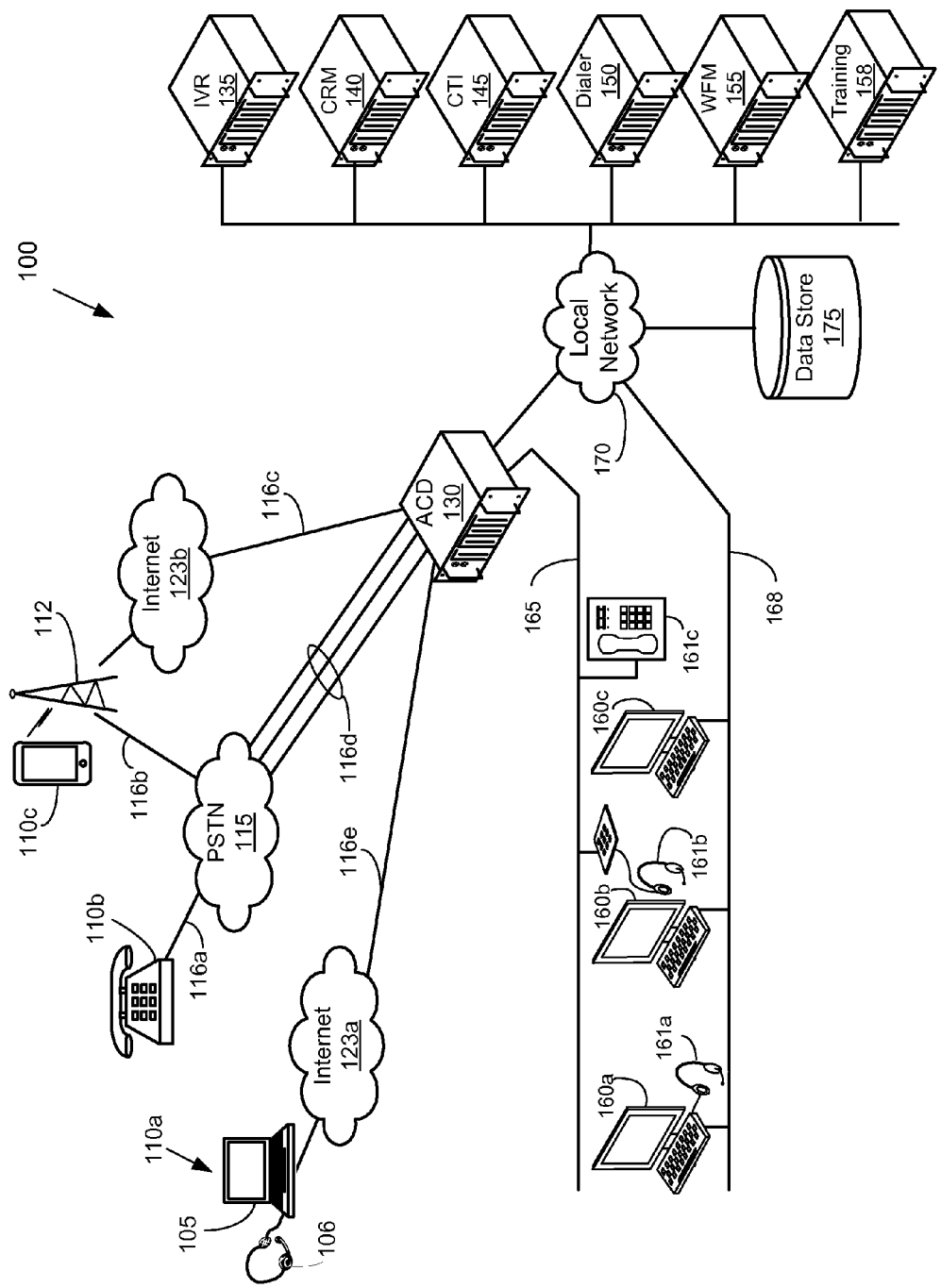
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from, or placed to, the party. The term "caller," if used, will generally refer to a party calling the call center, but in many cases this usage is exemplary. Thus, use of the term "caller" is not intended to limit the concepts to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123b using Internet-based protocols. Other types of networks, such as those based on ATM MPLS or other types can be used. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time division multiplexing ("TDM") technology.

Voice calls may also originate from a calling party employing a so-called "IP phone," "VoIP phone," or "soft phone" 110a. In one embodiment, this device may comprise a computing device 105, such as a laptop or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two-way communication, or a portion of the two-way communication depending on the context. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, e.g., text, email, video chat, facsimile, etc.

Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including but not limited to a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, although separate devices may be used. In some instances, "workstation" may be used in reference to either the data or voice capability at the agent's position. For example, "routing the call to the agent's workstation" means routing a call to one of the types of voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

Agents typically log onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer 160a-160c over facilities 168 along with routing the call to the agent's workstation phone.

For example, the ANI may also be used to ascertain a party's status (e.g., a "Gold Level" customer warranting premium service), to facilitate the ACD 130 routing the call to a select group of agents. The data store 175 may include one or more databases storing different information such as, for example, records of caller information. The data store 175 can be integrated with the CTI server 145, the ACD 130, or segregated as a standalone media or database. Thus, the call and associated call data are presented at the agent's headset 161*b* and their computer 160*b*.

The ACD 130 may place a call in a queue if there are no suitable agents available, or the ACD 130 may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other components, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160*a*-160*c*, as well as other components, may involve using a local area network ("LAN") 170. Other configurations are possible, such as, but not limited to, using a wide area network, wireless network, router, bridge, direct point-to-point links, etc.

When an agent is interacting with a party, the agent may use their workstation computer 160*b* to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles; the call center may also originate communications to a called party, referred to herein as "outbound" communications. Any of the previously identified inbound calling parties can also receive calls originating from the call center. In some embodiments, a call center may employ a dialer 150, such as a predictive dialer or automated dialer and also referred to as an outbound dialer, to originate outbound calls on behalf of an agent at a rate designed to meet various criteria. Similar to the other components within the call center architecture 100, the dialer 150 may comprise one or more software modules executing on a processing device hardware platform.

The dialer 150 is typically configured to dial a list of telephone numbers to initiate outbound calls, which can be accomplished by instructing the ACD 130 to originate calls. In some embodiments, the ACD 130 may include functionality for originating calls, and if so, this component may be referred to as a private automatic branch exchange ("PBX" or "PABX"). In other embodiments (not shown), the dialer 150 may directly interface with voice trunks using facilities 116*d* to the PSTN 115 for originating calls or facilities 116*c* to an Internet provider 123*b*. After the calls are originated, a transfer operation by the ACD 130 may connect the call with an agent, or place the call in a queue for an available agent. In the latter case, announcements or music may be provided to the party.

In various embodiments, the dialer 150 may make use of one or more algorithms to determine how and when to dial the list of numbers so as to minimize the likelihood of a called party being placed in a queue while maintaining target agent utilization. The dialer 150 can originate calls manually and under the control of the agent, can automatically dial calls after being previewed by the agent, or other forms of originating an outbound call. The dialer 150 may access a list database, which could be in the data store 175.

Another server that may be employed in a call center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to generate a work roster of agents. In other words, the WFM server 155 schedules agents for their work shifts according to the anticipated needs of the call campaigns. Typically, the WFM server 155 uses a minimum time interval, referred to herein as a "scheduling interval," to generate the agent schedule. Each individual agent's work shifts are based on the scheduling interval, and the current agent's shift schedule is communicated to the ACD 130 so that is it aware of which agents are expected to log into their workstations. In various embodiments, the scheduling interval may be 15 or 30 minutes. The ACD 130 may be aware of the agent's schedule, as it expects and confirms which agents log into their workstations at certain times. The ACD also typically obtains and processes measurement data along the same intervals as the scheduling interval.

Another processing device may be a training server 158 configured to deliver training information to agents under various conditions. The training server may incorporate its own internal database comprising the training content, or may access an external database, such as a database residing on the data store 175. The training server 158 can communicate the training content over the local network 170 to the agent's workstation. The training content may comprise different forms, as will be discussed.

Finally, in various embodiments, the call center architecture 100 may include other servers to perform various functions. For example, an additional server (not shown) could be a quality assurance system that records communications fielded by an agent or allows a manager to monitor a voice session to ensure calls are being handled correctly.

Although the above devices are referenced as "servers," each may be also referred to as a "unit," "component," "processing device," or "system." A server may incorporate a local data store or interface with an external data store. Use of the word "server" does not require the component to interact in a client-server arrangement with other components, or using a particular protocol, although that may be the case. Further, the above components may be located remotely from (or co-located with) other components. Furthermore, one or more of the functions of these components may be implemented on a single processing device to perform the functions described herein. For example, in various embodiments, one or more functionalities of the ACD 130, the IVR 135, the CRM server 140, the CTI server 145, and/or the dialer 150 may be combined into a single hardware platform executing one of more software modules. In addition, the call center architecture 100 may be provided as a hosted solution, where the call processing functionality is provided as a communication service (a so-called "communication as a service" or "CaaS") to a call center operator. In other embodiments, functionality of the WFM server 155 and the training server 158 may be combined on a single hardware platform. Thus, there is no requirement that the servers identified above actually be located or controlled by a call center operator.

In addition, the agent positions can be co-located in a single physical call center or multiple physical call centers. The agents may be remotely located from the other components of the call center, and may also be remotely located from each other. This configuration is sometimes referred to as a "virtual call center." A virtual call center may describe a scenario where agents work at home, using their own computers and telephones as workstations. In some configurations, a single physical location of the call center may not be readily identifiable. This may occur when the call processing functions are provided as a service in a hosted cloud computing environment and the agents positions are located in their individual residences.

Those skilled in art will recognize FIG. 1 represents one possible configuration of a call center architecture 100, and that variations are possible with respect to the protocols, facilities, technologies, and equipment used. For example, various algorithms and queuing arrangements may be defined to efficiently process calls. In other configurations, the ACD 130 may be configured to process, not only voice calls, but also other forms of communication, and perform corresponding call processing functions for email, text, or facsimile calls. Alternatively, a web server (not shown in FIG. 1) may receive or originate email and text communications, as well as interact with other call center components.

Regulatory Restrictions

The Telephone Consumer Protection Act ("TCPA") of 1991 makes it unlawful under certain conditions to originate any call using an automatic telephone dialing system or an artificial or prerecorded message to any wireless telephone number. Thus, generally speaking, it is illegal to originate telemarketing calls to wireless telephone numbers. However, wireless carriers making calls to their own wireless subscribers, for which the subscribers are not charged in any way for the call, are not prohibited under the TCPA from originating such calls. Thus, a wireless carrier may contact its subscribers under certain conditions to offer, e.g., new products or services.

In addition, solicitation telemarketing calls must be further limited based on the time of day when they originate to the called party. Specifically, telephone solicitations must occur between the hours of 8:00 a.m. and 9:00 p.m. based on the local time of the called party. Specifically, the time zone of the called party, not the originating call center, should be used for determining the appropriate time of day for compliance. In many cases, the call center may be located in a different time zone than the called party. For purposes herein, the appropriate time window for a telemarketing call is referred to as the "call window" or "calling window."

Various aspects complicate the determination of what is the called party's local time. For wireline telephone numbers, the telephone numbers were historically assigned to a wire center (e.g., switching telephone office) in blocks of numbers defined by an area code and central office code. Each is a three digit number, and the combination is sometime referred as a NPA-NXX. The NPA stands for "numbering plan area" (a.k.a. "area codes") and NXX is the central office code. For the NXX central office code, the N can be any number 2-9, and X can be any number 0-9. An example of a NPA-NXX is 404-847 which is associated with Atlanta, Ga., and is located in the eastern time zone. The complete, dialable telephone number has a four digit line number appended to the central office code. Thus, the complete telephone number format is based on ten digits and can be represented as NPA-NXX-XXXX.

Number portability allows telephone numbers to be "ported" from a wireline carrier to a wireless carrier. Thus, it is difficult to ascertain based on the NPA-NXX itself whether the complete telephone number is serviced by a wireline or wireless carrier. In order to properly route calls, various databases are maintained and made available by communication providers that are updated to reflect the current carrier serving a particular telephone number. Database services are available to indicate whether the number is a wireline or wireless number.

A key benefit of wireless service (e.g., cellular service) is portability of the subscriber allowing users to use their cellular phone at home, work, or while traveling. Thus, while a wireless telephone number may have been originally assigned to a subscriber in a given city, the subscriber can be located in another city, state, or region of the country.

Furthermore, wireless users frequently may move or relocate to another part of the country without giving up their wireless number. Thus, even though a wireless user may have originally subscribed to wireless service while living e.g., in Chicago, they may now be living in New York. The wireless user may retain their wireless number having a NPA-NXX that traditionally was associated with the Chicago area.

It can be appreciated that when originating a call to a wireless number, it is not readily discernible what time zone the called party is located in. For simplicity purposes, it is assumed that the user is carrying their mobile phone, so that the location of the user is the same as the location of their mobile phone. Further, reference to the "location of the wireless number" is understood to mean the location of the mobile phone associated with that wireless number. Similarly, reference of the "time zone of the wireless number" is understood to be the current time zone in which the mobile phone associated with that wireless number is operating in.

Call Center Originating Calls to a Wireless Subscriber

Figure 2:
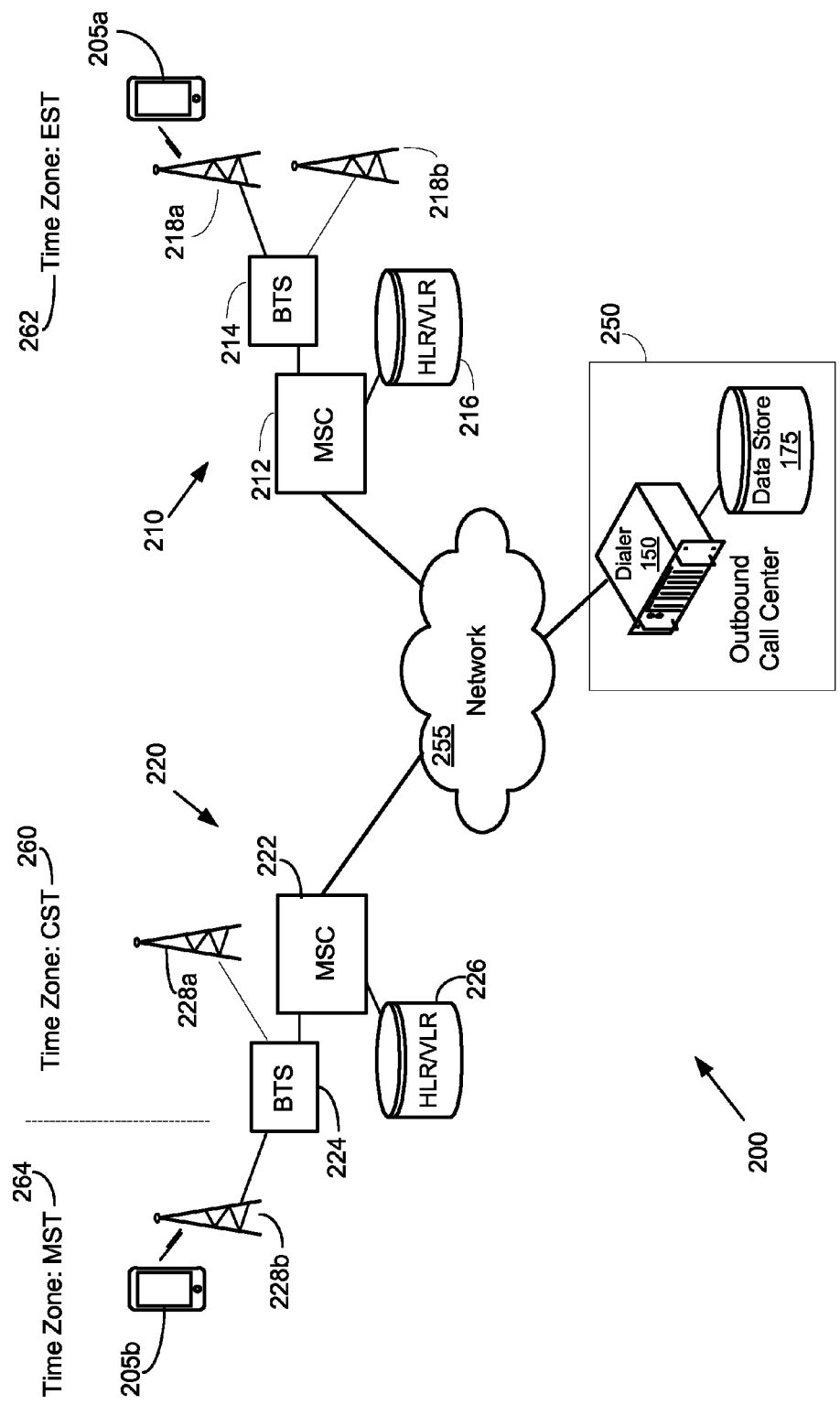
FIG. 2 shows one embodiment of a call center originating calls to a wireless called party that can be located in various time zones.

FIG. 2 shows one embodiment 200 of a call center originating calls to a wireless subscriber that can be located in various time zones. In this embodiment, a call center 250 is diagrammatically illustrated in a simplified form focusing on the dialer 150 and a data store 175, which can be an internal or external database in various embodiments. The data store 175 stores a list of telephone numbers (a "list") to which originating calls are to be made. The data store may also indicate a campaign that each telephone number is associated with. In various embodiments, a single list or multiple lists may be defined. The use of the word "list" should not imply to limit the structure of the data in any way.

The dialer 150 access the list in the data store 175 to determine which numbers are to be dialed. Various forms of dialing can be used, including but not limited to predictive dialing, on-demand dialing, preview dialing, etc. The calls are setup to a network 255, which may be the PSTN 115 from FIG. 1, an Internet provider 123, MPLS network, or other type of network.

FIG. 2 can be used to illustrate a call established to a wireless subscriber represented by a wireless smart phone 205a. The call is routed from the network 255 to the mobile service provider 210, which comprises a mobile switching center ("MSC") 212. The presence of the call at the MSC 212 causes the MSC to access a home location register ("HLR")/visitor location register ("VLR") database 216. The HLR/

VLR 216 may be considered as either a single or two distinct databases, and may be housed in a single platform, or in different databases. The HLR indicates where each wireless subscriber of the mobile service provider 210 is located within the home wireless provider 210. The VLR indicates the location of "visiting" wireless subscribers from another wireless network 220. Wireless subscribers can roam into another network, and when being served by another service provider, that subscriber is treated as a "visitor."

A visited mobile service provider will inform the home wireless service provider of the presence of a visitor. For example, if the subscriber travels to another mobile service provider 220, as evidenced by the presence of the smart phone 205b, then the wireless subscriber is noted as a visitor in the visited MSC's VLR 226. The visiting mobile service provider 220 will also inform the home mobile service provider 210 of the presence of the subscriber, so that home MSC 212 can update its HLR 216.

The MSC 212 may interconnect with various base transceiver stations 214, which in turn, interconnect with various cellular antenna/receivers on a cell tower 218a, 218b. The HLR 216 stores an indication that the smart phone 205a is currently in the range of a particular cell tower 218a. More specifically, each cell tower may be divided into three sectors, and the HLR knows which sector of which cell tower the user is currently located in. Each sector of each cell tower typically serves, but not necessarily, an area in a single time zone. For smart phone 205a, this is depicted as being in the eastern standard time ("EST") zone 262.

If the smart phone 205a roams to another service provider 220, as shown by smart phone 205b, then the sector location in the HLR 226 is updated, and the home mobile service provider 210 is informed. If a call is established from the dialer 150 to the MSC 212 for the mobile subscriber, the MSC 212 will query the HLR 216 and determine that the subscriber is served by mobile service provider 220, and forward the call to the MSC 222.

After the call is redirected to the MSC 222, the MSC 222 checks the HLR 226 for the current tower associated with the smart phone, and routes the call to the BTS 224 associated with the tower. The call is then offered to the smart phone 205b.

When the call is offered to the subscriber, the subscriber may be in another time zone than the originating party. In the case of smart phone 205b, it may be located in the mountain standard time (MST) zone 264. It is possible that the wireless service provider 220 may have a cell tower 228a in another time zone, e.g., in central standard time ("CST") 260. Because the location of the smart phone is known, it is possible to determine a time zone of the subscriber at the home HLR 216 or other database made available by the wireless provider.

Although FIG. 2 describes two wireless service providers 210, 220, this same architecture can be used by a single wireless provider having two disparate serving areas. For example, the serving area of MSC 212 may be one metropolitan area, and the serving area of MSC 222 may be in another area in an adjacent state, but both are associated with the same wireless carrier. Many wireless carriers have a nationwide network and may maintain wireless network infrastructure in many states and many time zones.

When the dialer 150 originates the call, the number on the list may indicate that the number is a wireless number. However, the dialer 150 generally does not know the current location of the caller. The dialer may know, at best, that the NPA-NXX is usually associated with a current time zone, but that does not mean the subscriber is presently in that time zone.

The above description is a simplified description of how calls originating from a call center to a wireless subscriber are routed to a visiting mobile service provider. It should be recognized that there are various architectures that may be defined based on various cellular standards. Many other processing aspects are required to route a call properly, but those skilled in the art will recognize how the technologies disclosed herein can facilitate a call center to use location information for offering calls to a wireless subscriber.

In some instances, the wireless carrier may utilize a call center 250, either owned by a third party or under the control of the wireless carrier, to originate calls to its own subscribers. While a third party marketing entity may not be authorized to contact wireless subscribers on an unsolicited basis, a wireless carrier itself is authorized. Thus, the wireless carrier may either incorporate the call center 250 to originate telemarketing calls or contract out to a third party to perform the telemarketing calls on its behalf.

The dialer 150 could access in real time the HLR database 216, or another database providing location information of the mobile handset, so as to query the location of the subscriber prior to originating the call. Alternatively, the database queries could provide a current time zone of the subscriber's current location. This latter approach avoids the dialer 150 from having to use the location information to then determine the local time zone of the wireless called party.

Flowchart for Originating a Telemarketing Call to a Wireless Subscriber

Figure 3:
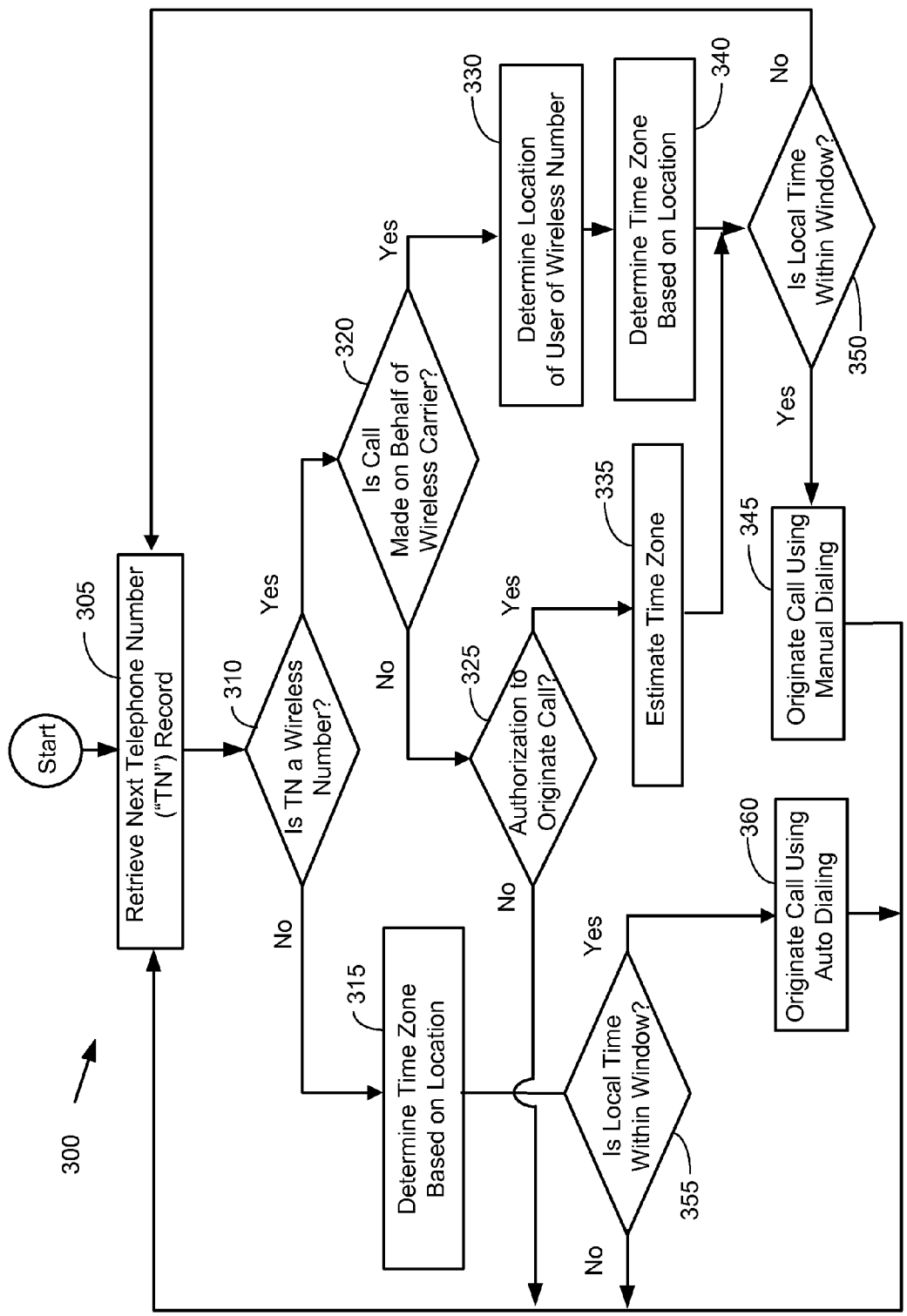
FIG. 3 shows one embodiment of processing a called telephone number by a call center using location based information associated with a wireless number.

Turning now to FIG. 3, additional details will be provided regarding the process flow 300 for originating a call by a call center to a wireless subscriber using location information to determine an appropriate calling window. The logical operations described herein may be implemented (1) as a sequence of computer implemented operations and/or as one or more program modules, including a list processing program module running on a computing system, such as a server, and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. Greater or fewer operations may be performed than shown in the figures and described herein. These operations may also be performed in a different order than those described herein.

Turning now to FIG. 3, the process begins in operation 305 with retrieving a next telephone number ("TN") record from the outbound dialing list. The TN record includes various information, including but not limited to, the called party telephone number and whether it is a wireless number or not. This can be indicated in various ways, including an explicit flag. In other embodiments, there may not be any explicit indication in the TN record, but rather another database is queried to determine whether the telephone number is a wireless number or not. The process of comparing the telephone number against values in another database, such as a database of known wireless numbers, is a process termed herein as "scrubbing" the telephone number.

In operation 310, the TN is tested to determine if it is a wireless number. If the indication is that it is not a wireless number, e.g., it is a wireline number, then in operation 315, the TN can be used to determine the time zone based on the location at which the NPA-NXX is assigned. The process then proceeds to operation 355 where the local time zone associated with the wireline number is compared to determine if it is within the regulatory call window requirements. Typically, the call window is within the window of 8:00 a.m. to 9:00 p.m. In some embodiments, the call window may be further narrowed based on other considerations. For example, some call centers may avoid calling before 8:30 a.m. of the called party.

If the local time is within the calling window in operation 355, then the call can originate in operation 360. Because the call is to a wireline number, the call can originate using an autodialing procedure. This may be a form of predictive dialing, preview dialing, etc. If the call is not allowed in operation 355 because of calling window constraints, then the process loops back to operation 305 to retrieve the next record.

If, in operation 310, it is determined that the TN is a wireless number, then in operation 320 a test is made to determine if the call is being originated on behalf of the wireless carrier serving that wireless number. A third party call center can make a call as a contracted entity, e.g., on behalf of the wireless carrier. For example, the wireless carrier may use a third party outbound call center to solicit the wireless carrier customers for new products offered by the wireless carrier or to remind the wireless subscriber of an unpaid bill. In other embodiments, the wireless carrier may operate the call center, e.g., as an internally controlled call center.

If the call is being made on behalf of, or by, the wireless carrier in operation 320, then in operation 330 the location of the wireless subscriber associated with the TN may be determined. The call center dialer 150 may, e.g., query the mobile service provider to obtain a current location of the wireless subscriber. This could occur by querying the MSC 212, the HLR 216, gateway, or other database.

Once a location of the wireless called party is determined, then a time zone can be determined in operation 340. The location information may be indicated by longitude and latitude coordinates, metropolitan statistical area ("MSA") identification, state/city, zip code, or any other form of location identifier. The location information can then be used to ascertain the local time zone of the wireless subscriber. The processing flow then tests in operation 350 whether the local time zone is within the calling window.

If the local time of the subscriber in operation 350 indicates that the call can originate, then operation 345 originates the call using manual dialing. Because the call is to a wireless caller, automatic dialing in violation of the regulations cannot occur, and one of the other forms, such as manual dialing techniques known to those skilled in the art, must be used. Manual dialing may include, but is not limited to, preview dialing or click-to-dial procedures. Typically, in manual dialing the agent controls some aspect of the call origination. If the call cannot be completed in operation 350, then the process loops back to operation 305 to process the next TN record. Appropriate records of the outcome of each call attempt may be recorded.

If, in operation 320, a determination is made that the call is not being originated on behalf of the wireless carrier, then operation 325 occurs. In this operation, the call to the wireless subscriber may be authorized by the subscriber. For example, the only means of contact to the subscriber may be using a wireless number, and the subscriber may have authorized being contacted using the wireless number. If authorization is not provided, then the process loops to retrieve the next TN in operation 305.

If there is authorization to originate a call in operation 325, then the process proceeds to operation 335 which is to estimate the time zone. The time zone is "estimated" because it is presumed that if access to the location information maintained by the carrier is not possible for privacy concerns, then there may be some uncertainty as to the actual time zone. Recall that this processing branch proceeded above from operation 320 because the call is not being made on behalf of the wireless carrier, and therefore the call center may not have access to the carrier's HLR data or equivalent data.

List Data Structure Format

FIG. 4 illustrates a list file data structure indicating called telephone number records according to one embodiment disclosed herein. The structure can be modeled as a table 400 having various columns and can be stored as a list database in one embodiment. In one embodiment, the first column 405 is the telephone number of the called party. Typically, this comprises a TN having a conventional NPA-NXX-XXXX format. The next column 410 comprises a wireline/wireless indication. This indicates whether the telephone number is currently associated with a subscriber of a wireless provider or not. In some embodiments, this field is not present. Rather, the TN is scrubbed against another database that indicates the nature of the number or other additional information.

The third column 415 indicates whether the call center is authorized to originate a call to the TN on behalf of the wireless service provider. In other words, if the wireless service provider has requested the call center to solicit the wireless subscribers so that the appropriate regulatory requirements are met, this is set to "yes."

The next column 420 indicates whether there is appropriate wireless user authorization for the call. Finally, the last column 425 may indicate that last known, or estimated time zone of the number, in the absence of determining the location of the wireless TN and the current time zone. Thus, in the absence of location derived time zone information, this value may be used to compare whether the local time comports with the regulatory requirements. In one embodiment, the NPA of the wireless number is used to determine the local time zone.

In this example, three values are illustrated in three rows 450, 460, 470. In the first row 450, the number 404 555-1212 is indicated as a wireless number, and the outgoing call campaign is being made on behalf of the wireless carrier. Thus, in this case the call can be made to the wireless user if the appropriate wireless carrier authorization requirements are met. In this case, there is no need for any specific user authorization, so this field may indicate a "not applicable" or "N.A." value. The call center may query e.g., a location database of the wireless carrier to determine a current location of the subscriber, and then derive the appropriate time zone. In the absence of the ability to do this, e.g., if it is not possible to receive location information and thus determine the current time zone, the TN is presumed to be in the time zone of the area code. In this example, it is presumed to be the eastern time zone, since the 404 area code is conventionally associated in the eastern time zone.

The next number, 404 555-1228 is indicated as a wireline number. Since this is not associated with a wireline carrier, any call to this number is not a call made on behalf of a wireless carrier. Hence the "no" indication is present in the third column 415. The third number, 404 556-0020 is also a wireless number. However, there is wireless user authority provided to originate a solicitation call on behalf of the wireless carrier, and so solicitation calls may be made. An indication that the number is usually associated with the pacific standard time zone is indicated. This may have been indicated based on prior contact with the user (e.g., this could be assumed based on an address of the user). In practice, additional information is likely to be present that may supplement or allow the above information to be derived.

Other structures and formats for the TN record tables shown in FIG. 4 are possible. For example, each TN may be associated with a contact name, address, location, and zip code (not shown in FIG. 4). It is possible that a contact name may be associated with more than one TN. For example, one TN may identify the contact's home telephone number, and a second TN may identify the contact's cellular number. Further, information may identify one TN as a primary or preferred telephone number to use and another as a secondary contact. This could be based on the time of day. The above could be stored in a single TN record or in multiple TN records.

Although not shown in FIG. 3, the processing of a TN record in the list file may skip over a telephone number for a called party if contact was previously successfully made on another number associated with the called party. Thus, the system may dial a first wireline number of the contact (e.g., a preferred contact number) using the autodialing procedure as indicated in FIG. 3, and then if there is no answer, dial a second wireless number of the contact (e.g., a secondary contact number), but using manual dialing. Thus, the system can alternate dialing forms based on each record or number in the list, as well as skip certain numbers based on prior contact history with the called party.

Figure 5:
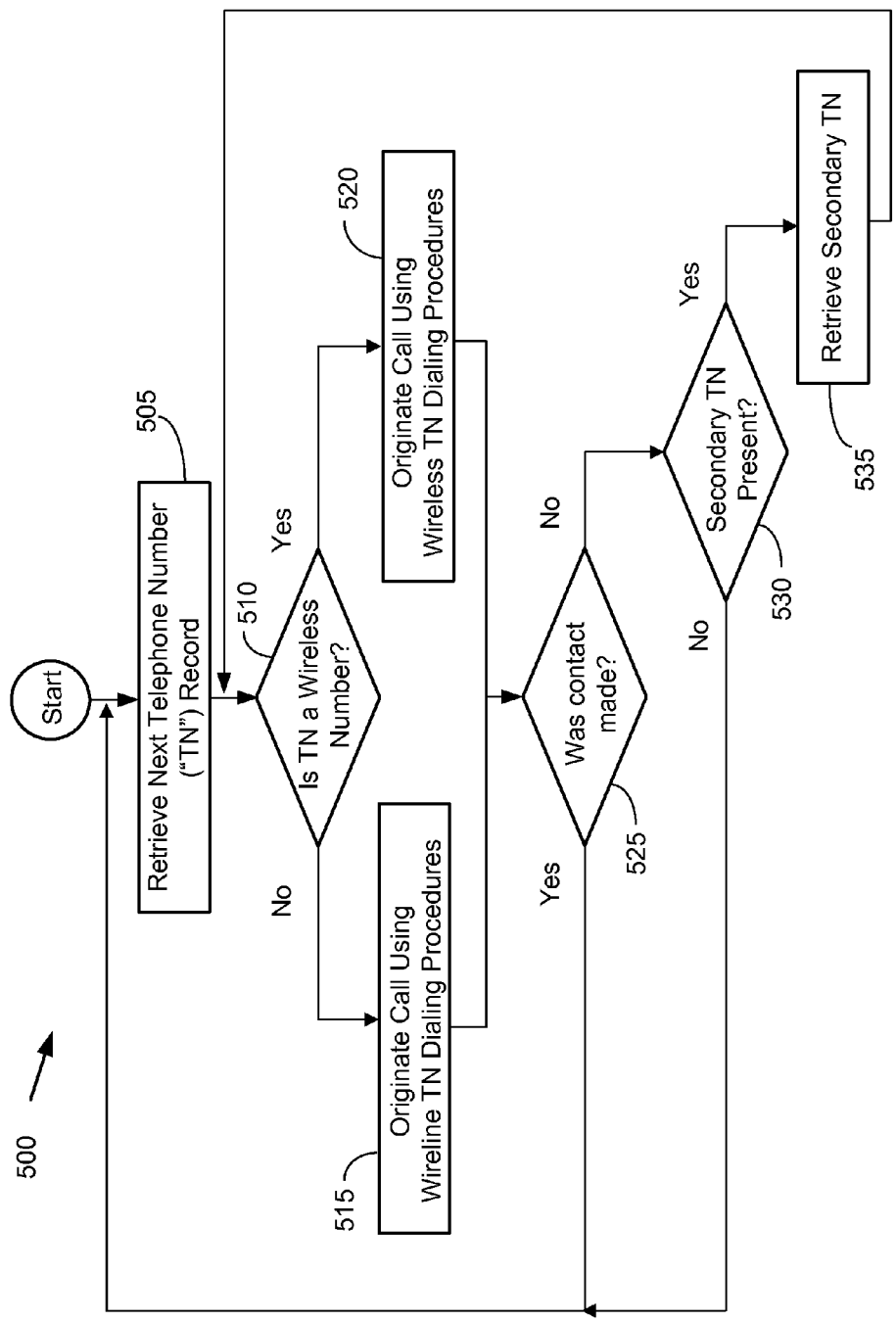
FIG. 5 illustrates a processing flow for processing a list of telephone numbers for outbound calls by a dialer in a call center according to one embodiment disclosed herein.

This aspect is illustrated in part in FIG. 5. FIG. 5 illustrates a processing flow 500 for processing a list of telephone numbers for outbound calls that may include a secondary telephone number. The flow begins with operation 505 of retrieving the next TN record to be processed. In this embodiment, a TN record may comprise a primary (or preferred) telephone contact number and a secondary telephone contact number. Upon examining the primary telephone contact number, a determination is made whether the TN is a wireless number of not in operation 510. If the number is a wireline number, then in operation 515 the TN is processed using wireline dialing procedures as discussed above, and as is known to those skilled in the art. If the TN is a wireless number, then in operation 520, the call is originated using wireless TN dialing procedures as discussed above. Specifically, the wireline procedures may use predictive dialing, whereas wireless procedures may use manual dialing.

In either case, a determination in operation 525 is made as to whether contact was made. If so, this aspect is recorded, and the process proceeds by looping back to operation 505. If no contact was made, a determination is made in operation 530 whether a secondary telephone number is present in the record. Not all records will have a secondary telephone number, and if not present in the current record, then the process loops back to operation 505. If a secondary telephone number is present, then the process retrieves the secondary telephone number in operation 535 and loops back to operation 510. The secondary telephone number is then processed by determining whether it is a wireline or wireless number as discussed above. The process completes until the last record in the list is processed.

Figure 6:
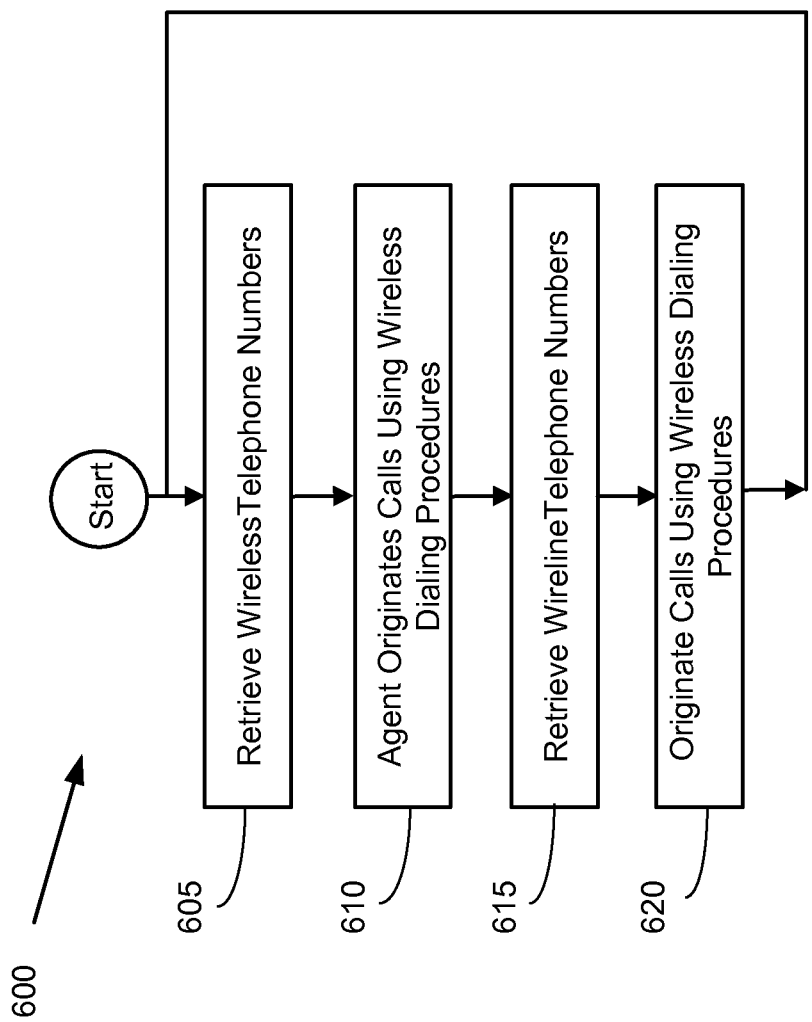
FIG. 6 illustrates a processing flow for processing different types of telephone numbers for outbound calls according to one embodiment disclosed herein.

FIG. 6 illustrates another procedure 600 that may be used by the dialer 150 for originating calls on behalf of an agent in a call center. This may be combined with the above procedures. The dialer may retrieve in operation 605 a subset of wireless telephone numbers from a larger list. The subset may be defined as an absolute number (e.g., 25 numbers) of telephone numbers or as a percentage of a list of telephone numbers (e.g., 5%). In operation 610, the agent then originates a call to the first of the numbers using the wireless dialing procedures. These procedures may involve a preview dialing mode or manual dialing mode, where the agent causes the dialing of the call to the wireless number and is able to monitor the audible progress of the call. The process repeats for each of the calls in the list as defined for operation 605.

Once the subset of wireless numbers have been dialed, then the system retrieves a subset of wireline numbers in operation 615. Again, this may be defined by selecting an absolute number of TNs from a wireline list (i.e., a separate, larger list) or a percentage of numbers therefrom. These calls are then originated by the dialer in operation 620 using the appropriate wireline dialing procedures. In one embodiment, the dialer performs predictive dialing according to well known techniques.

The operations 605 and 610 may be performed in reverse order instead, e.g., after operations 615 and 620. Thus, the dialing alternates from dialing a subset of wireless numbers and a subset of wireline numbers. Other techniques may be used to alternate between originating a call to a wireless number and a wireline number. These alternating calls may be made on behalf of a single agent, a team of agents, or a shift of agents. Alternating the dialing procedure may make the agent work experience less tedious, or otherwise alter the workflow and aid in maximizing agent productivity.

In another embodiment, the agent may be presented on their computer with two windows, each of which presents dialing information for a call originating of a certain type. Thus, a left window on the computer display could present information associated with originating a wireline call, while a right window could present information associated with originating a wireless call. This allows the agent to shift between the two types of dialing procedures, and/or allows the agent to perform some tasks in parallel, as appropriate.

Dialer Architecture

Figure 7:
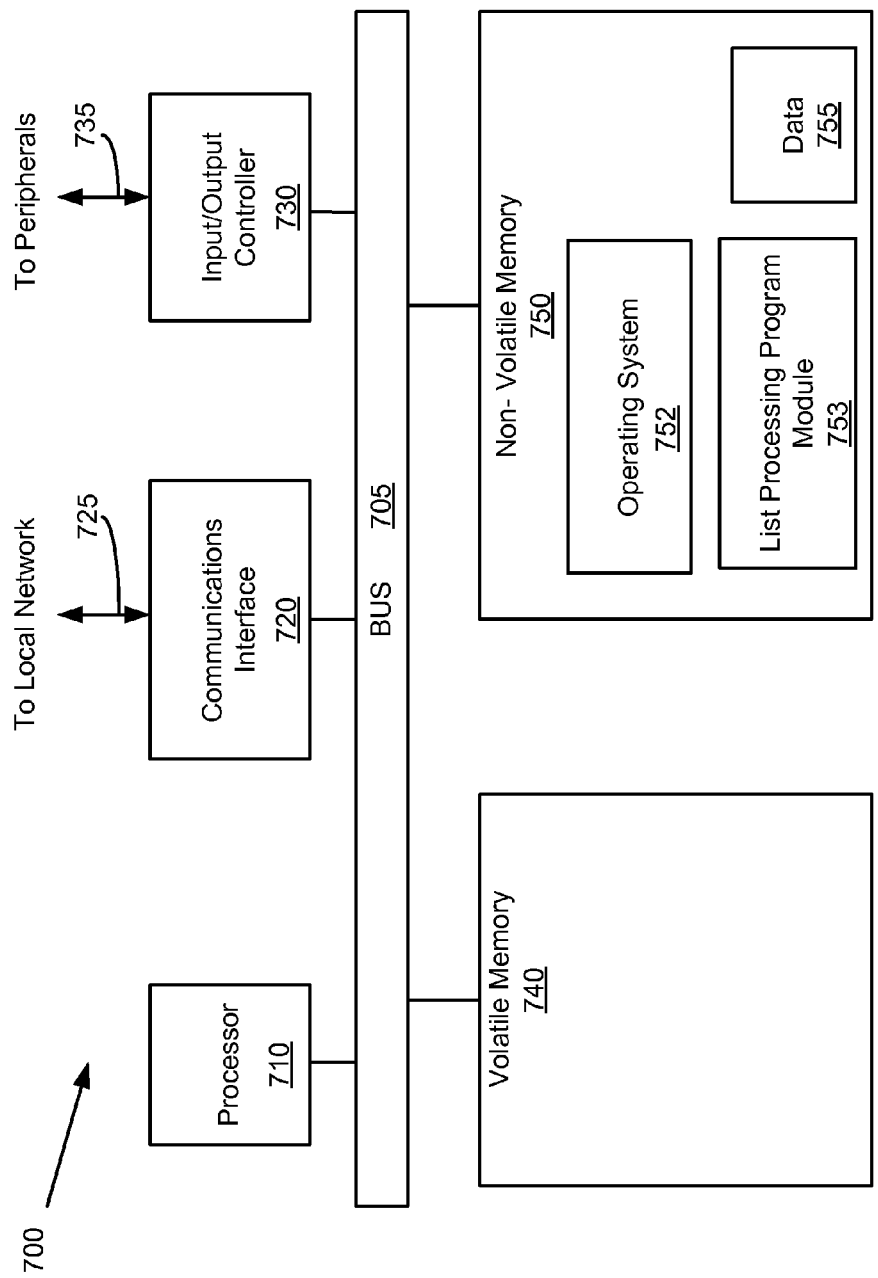
FIG. 7 is an exemplary schematic diagram of a processing device used in one embodiment of the call center architecture to practice the technologies disclosed herein.

As discussed in conjunction with FIG. 1, the call center architecture 100 may comprise various components, such as a dialer 150, that comprise a processing system. FIG. 7 is an exemplary schematic diagram of a server that may be used in an embodiment of the call center architecture to practice the technologies disclosed herein. FIG. 7 provides an exemplary schematic of a processing system 700, which could represent individually or in combination, for example, the ACD 130, CTI server 145, WFM server 155, agent computer 160a, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via the local network 170 with various external devices, such as other servers of FIG. 1. In other embodiments, communication may be via wired, optical, or wireless networks (or a combination thereof). The interface 725 may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc.

The processor 710 may be configured to execute instructions stored in volatile memory 740, non-volatile memory 750, or other forms of computer-readable storage media accessible to the processor 710. The volatile memory 740 may comprise various types of memory technologies, including, but not limited to: random access memory ("RAM"), dynamic random access memory ("DRAM"), static random access memory ("SRAM"), and other forms well known to those skilled in the art. The non-volatile memory 750 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. Specifically, the non-volatile memory 750 may store one or more list processing program modules 753 for performing the process and/or functions associated with the technologies disclosed herein. The non-volatile memory may also store operating system code 752 containing instructions. The list processing program module 753 may also access, generate, or store list data 755 in the non-volatile memory 750, as well as in the volatile memory 740. The list data 755 may comprise the aforementioned telephone records or other data associated with performing the disclosed procedures. The volatile memory 740 and/or non-volatile memory 750 may be used to store other information including, but not limited to: records, applications, programs, scripts, source code, object code, byte code, compiled code, interpreted code, machine code, executable instructions, or the like. These may be executed or processed by, for example, the processor 710. These may form a part of, or may interact with, the program module 753.

The technologies described herein may be implemented in various ways, including as computer program products comprising memory storing instructions causing a processor to perform the operations associated with the above technologies. The computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified computer-readable media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for originating an outbound call for an agent in a call center comprising:
   retrieving a record from a list database within the call center, the record comprising a telephone number used to originate the outbound call;
   determining by an outbound dialing device within the call center whether the telephone number is a wireless telephone number or a wireline telephone number;
   if the telephone number is a wireline telephone number, then originating the outbound call to the wireline telephone number using an automated dialing procedure comprising:
      determining a local time zone associated with the wireline telephone number,
      determining whether the local time zone is within a defined calling window, and
      if the local time zone associated with the wireline telephone number is within the defined calling window, then originating the outbound call by the outbound dialing device and connecting the outbound call to the agent; and
   if the telephone number is a wireless telephone number, then originating the outbound call to the wireless telephone number using a procedure under control of the agent comprising:
      determining whether the outbound call is being made on behalf of a wireless carrier, and
      if the outbound call is being made on behalf of a wireless carrier:
         querying a current location of a wireless device associated with the wireless telephone number by the call center from a database populated by the wireless carrier,
         determining the local time zone associated with the wireless telephone number based on the current location of the wireless device,
         determining whether the local time zone associated with the wireless telephone number is within the defined calling window, and if the local time zone associated with the wireless telephone number is within the defined calling window, then originating the outbound call under control of the agent.

2. The method of claim 1, wherein originating the outbound call under control of the agent is performed by the agent manual dialing the wireless telephone number.

3. The method of claim 1 further comprising selecting both a first group of wireline telephone numbers and a second group of wireless telephone numbers by the outbound dialing device for call origination.

4. The method of claim 3, wherein the agent is involved in the call origination from the first group and the second group.

5. The method of claim 1, wherein determining whether the telephone number is a wireless telephone number or a wireline telephone number is carried out by the outbound dialing device querying a database of known wireless telephone numbers.

6. The method of claim 1 further comprising, if the telephone number is a wireless telephone number and the outbound call is not being made on behalf of the wireless carrier:
   determining whether authorization has been received by a party associated with the wireless telephone number authorizing the call center to call the wireless telephone number, and
   if authorization has been received, then originating the outbound call to the wireless telephone number using the automated dialing procedure comprising:
      determining the local time zone associated with the wireless telephone number,
      determining whether the local time zone is within a defined calling window, and
      if the local time zone associated with the wireless telephone number is within the defined calling window, then originating the outbound call by the outbound dialing device and connecting the outbound call to the agent.

7. A non-transitory computer readable storage medium having stored instructions which when executed by a processor in an outbound dialer within a call center cause the processor to:
   retrieve a record from a list database within the call center, the record comprising a telephone number used to originate an outbound call;
   determine whether the telephone number is a wireless telephone number or a wireline telephone number;
   if the telephone number is a wireline telephone number, then originate the outbound call to the wireline telephone number using an automated dialing procedure to:
      determine a local time zone associated with the wireline telephone number,
      determine whether the local time zone is within a defined calling window, and
      if the local time zone associated with the wireline telephone number is within the defined calling window, then originate the outbound call and connect the outbound call to an agent; and
   if the telephone number is a wireless telephone number, then originate the outbound call to the wireless telephone number using a procedure under control of the agent to:
      determine whether the outbound call is being made on behalf of a wireless carrier, and
      if the outbound call is being made on behalf of a wireless carrier:
         query a current location of a wireless device associated with the wireless telephone number from a database populated by the wireless carrier,
         determine the local time zone associated with the wireless telephone number based on the current location of the wireless device,
         determine whether the local time zone associated with the wireless telephone number is within the defined calling window, and
         if the local time zone associated with the wireless telephone number is within the defined calling window, then originate the outbound call by having the outbound call placed under control of the agent.

8. The non-transitory computer readable storage medium of claim 7, wherein the agent places the outbound call to the wireless number by manual dialing the wireless telephone number.

9. The non-transitory computer readable storage medium of claim 7, wherein the stored instructions which when executed by the processor in the outbound dialer cause the processor to select a first group of wireline telephone numbers for origination and a second group of wireless telephone numbers for origination.

10. The non-transitory computer readable storage medium of claim 9, wherein the agent is involved in originating calls from the first group and calls from the second group.

11. The non-transitory computer readable storage medium of claim 7, wherein the stored instructions which when executed by the processor in the outbound dialer cause the processor to determine whether the telephone number is a wireless telephone number or a wireline telephone number by querying a database of known wireless telephone numbers.

12. The non-transitory computer readable storage medium of claim 7, wherein if the telephone number is a wireless telephone number and the outbound call is not being made on behalf of the wireless carrier, the stored instructions which when executed by the processor in the outbound dialer cause the processor to:
   determine whether authorization has been received by a party associated with the wireless telephone number authorizing the call center to call the wireless telephone number, and
   if authorization has been received, then originate the outbound call to the wireless telephone number using the automated dialing procedure to:
      determine the local time zone associated with the wireless telephone number,
      determine whether the local time zone is within a defined calling window, and
      if the local time zone associated with the wireless telephone number is within the defined calling window, then originate the outbound call and connect the outbound call to the agent.

13. A system for placing an outbound call for an agent in a call center comprising:
   a database storing a list of telephone numbers comprising a plurality of records used for originating outbound calls; and
   an outbound dialer comprising a processor configured to:
      retrieve a record from the list, the record comprising a telephone number used to originate the outbound call,
      determine whether the telephone number is a wireless telephone number or a wireline telephone number, if the telephone number is a wireline telephone number, then originate the outbound call to the wireline telephone number using an automated dialing procedure to:
- determine a local time zone associated with the wireline telephone number,
- determine whether the local time zone is within a defined calling window, and
- if the local time zone associated with the wireline telephone number is within the defined calling window, then originate the outbound call and connect the outbound call to the agent, and if the telephone number is a wireless telephone number, then originate the outbound call to the wireless telephone number using a procedure under control of the agent to:
- determine whether the outbound call is being made on behalf of a wireless carrier, and
- if the outbound call is being made on behalf of a wireless carrier:
  - query a current location of a wireless device associated with the wireless telephone number from a database populated by the wireless carrier,
  - determine the local time zone associated with the wireless telephone number based on the current location of the wireless device,
  - determine whether the local time zone associated with the wireless telephone number is within the defined calling window, and
  - if the local time zone associated with the wireless telephone number is within the defined calling window, then originate the outbound call by having the outbound call placed under control of the agent.

14. The system of claim 13, further comprising:
an agent workstation, wherein the agent workstation is configured to provide a manual dialing indicator to the processor to have the outbound call placed under control of the agent.

15. The system of claim 14, wherein the agent workstation is configured to process an outbound call to a wireline telephone number.

16. The system of claim 13, wherein the processor is configured to determine whether the telephone number is a wireless telephone number or a wireline telephone number by querying a database of known wireless telephone numbers.

17. The system of claim 13, wherein if the telephone number is a wireless telephone number and the outbound call is not being made on behalf of the wireless carrier, the processor is configured to:
- determine whether authorization has been received by a party associated with the wireless telephone number authorizing the call center to call the wireless telephone number, and
- if authorization has been received, then originate the outbound call to the wireless telephone number using the automated dialing procedure to:
  - determine the local time zone associated with the wireless telephone number,
  - determine whether the local time zone is within a defined calling window, and
  - if the local time zone associated with the wireless telephone number is within the defined calling window, then originate the outbound call and connect the outbound call to the agent.

* * * * *